(12) United States Patent
Henriques et al.

(10) Patent No.: US 10,917,450 B2
(45) Date of Patent: Feb. 9, 2021

(54) DELIVERY OF HIGH-FIDELITY CONTENT

(71) Applicant: Deluxe Entertainment Services Group Inc., Burbank, CA (US)

(72) Inventors: Weyron Henriques, Pasadena, CA (US); Dimitri Bouniol, Los Angeles, CA (US)

(73) Assignee: Company 3 / Method Inc., Burbank, CA (US)

( * ) Notice: Subject to any disclaimer, the term of this patent is extended or adjusted under 35 U.S.C. 154(b) by 144 days.

(21) Appl. No.: 15/884,015

(22) Filed: Jan. 30, 2018

(65) Prior Publication Data

US 2019/0238608 A1    Aug. 1, 2019

(51) Int. Cl.
  *H04L 29/06*    (2006.01)
  *G11B 27/10*    (2006.01)
  (Continued)

(52) U.S. Cl.
  CPC .......... *H04L 65/601* (2013.01); *G11B 27/005* (2013.01); *G11B 27/102* (2013.01);
  (Continued)

(58) Field of Classification Search
  CPC ....... G06F 13/00; G06Q 30/02; G11B 27/005; G11B 27/102; G11B 27/00; G11B 27/10; H04L 12/24; H04L 29/06; H04L 29/0809; H04L 29/08072; H04L 29/08117; H04L 41/0896; H04L 65/80; H04L 65/601; H04L 65/4076; H04N 5/33; H04N 5/268; H04N 7/16; H04N 7/18; H04N 7/165; H04N 7/173; H04N 7/185; H04N 7/188; H04N 7/17318; H04N 19/46; H04N 19/115; H04N 19/162; H04N 19/172; H04N 21/262; H04N 21/414; H04N 21/433; H04N 21/2343; H04N 21/2387; H04N 21/2743; H04N 21/4223; H04N 21/4227; H04N 21/4333; H04N 21/4622; H04N 21/4782;
  (Continued)

(56) References Cited

U.S. PATENT DOCUMENTS 6,496,980 B1    12/2002  Tillman et al.
2010/0050221 A1  2/2010  McCutchen et al.
(Continued)

OTHER PUBLICATIONS

Canadian Intellectual Property Office, "Office Action in Application No. 3,031,360," dated Jan. 29, 2020 (4 pages).

*Primary Examiner* — Robert B Harrell
(74) *Attorney, Agent, or Firm* — Dorsey & Whitney LLP

(57) ABSTRACT

Content is provided from a content distribution node in either low or high-fidelity form depending upon a state of an end-point node. A nominal variant of high-fidelity content is transmitted to an end-point node while a presentation function remains engaged at the end-point node. When determined that the presentation function is disengaged at the end-point node, the particular frame on which nominal variant is paused is identified. A high-fidelity frame of the high-fidelity content that corresponds to the particular frame on which play is paused at the end-point node is transmitted to the end-point node. The end-point node uses the high-fidelity frame to bring the particular frame on which play is paused at the end-point node to full fidelity.

26 Claims, 8 Drawing Sheets

(51) Int. Cl.
  *G11B 27/00*      (2006.01)
  *H04N 21/433*     (2011.01)
  *H04L 12/24*      (2006.01)
  *H04N 5/268*      (2006.01)

(52) U.S. Cl.
  CPC ...... *H04L 41/0896* (2013.01); *H04L 65/4076* (2013.01); *H04L 65/80* (2013.01); *H04N 21/4333* (2013.01); *H04N 5/268* (2013.01)

(58) Field of Classification Search
  CPC .......... H04N 21/4788; H04N 21/6587; H04N 21/8153; H04N 21/8586; H04N 21/23439; H04N 21/26216; H04N 21/41407
  USPC .......................................... 709/219; 725/109
  See application file for complete search history.

(56) References Cited

U.S. PATENT DOCUMENTS

| | | |
|---|---|---|
| 2010/0095340 A1 | 4/2010 | Ei et al. |
| 2014/0181653 A1 | 6/2014 | Schmidt |
| 2019/0191210 A1* | 6/2019 | Xiao ................. H04N 21/4333 |

\* cited by examiner

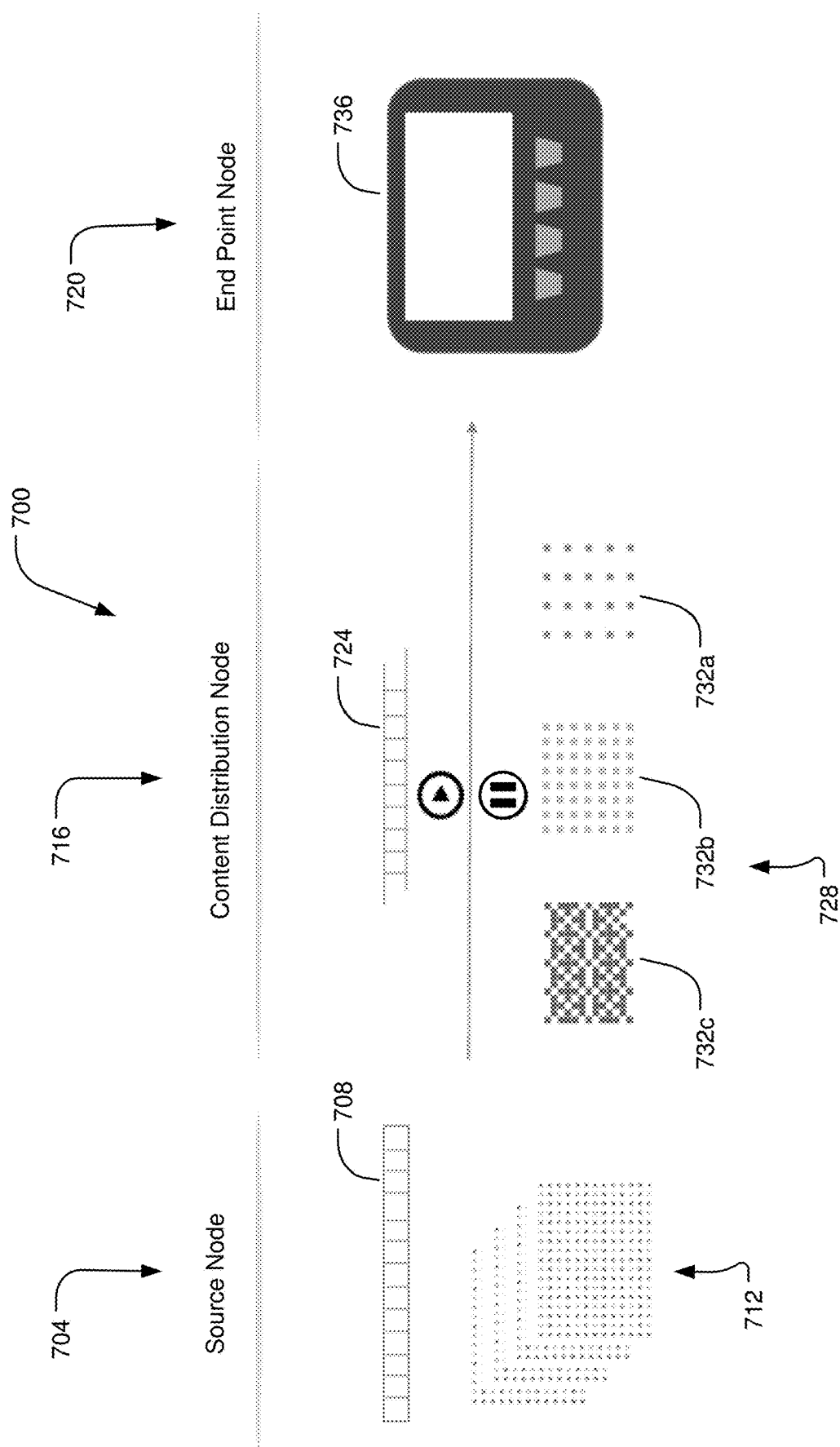

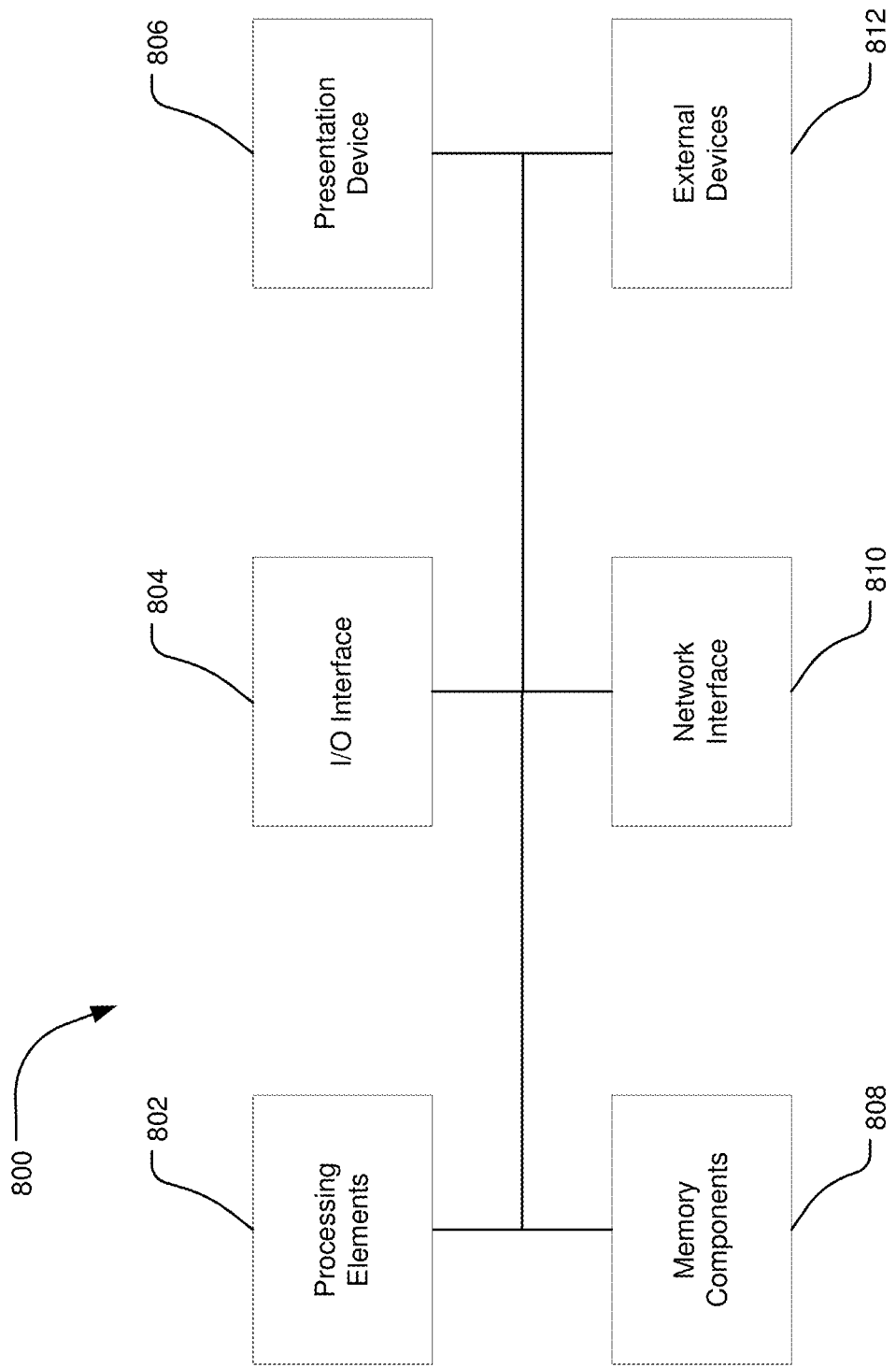

DELIVERY OF HIGH-FIDELITY CONTENT

TECHNICAL FIELD

The present disclosure is directed to systems and methods for delivery of high-fidelity content.

BACKGROUND

Digital content covers a broad spectrum of entertainment and non-entertainment visual products. Recent advances in digital camera technology have resulted in changes in the creation of entertainment and media content. Traditional content production typically employed analog techniques such as film stock for the capture of motion pictures. Digital cinematography, on the other hand, uses digital image sensors for the capture of motion pictures. In the past, digital camera technology failed to provide the level of image quality that could be achieved with traditional analog techniques. However, modern digital cameras provide a level of quality that equals or surpasses that of traditional video or film cameras. Today, a professional 6 k digital camera provides image quality that is approximately higher or equal to 35 mm film in resolution and dynamic range capacity. As a result, the use of digital cameras within content production has become widespread.

Content created during the making of entertainment based motion pictures, television episodes, commercials, non-scripted entertainment, news gathering and documentaries, is commonly referred to as dailies. The name arises from standard practices in the motion picture industry. Usually at the end of each day footage is digitally or chemically processed for viewing by the content creators and other stake holders of the production process. Dailies reflect the progress of the overall production. The term can also be used to refer to any raw footage, regardless of when it is processed or how it was captured.

Similarly, during the creation of digital effects, or character generated images, content creators often assemble dailies to screen and review work in progress visual effects and animation development. This will contain the previous days work by animators and effects artists in various stages of completion. Once a shot or scene is at the point where additional feedback from the director, producer or executives is needed, it will be assembled and provided for screening by the creative decision makers either as part of the normal dailies screening or as a separate weekly screening.

Viewing dailies allows the production stakeholders to see and hear exactly what was captured the previous day, allowing them to identify technical problems such as digital or organic anomalies that affect integrity of the images, or physical continuity errors that may affect the purpose of the footage. Dailies also allow the creators to review and approve talent performances and ensure that a scene has been appropriately covered from all necessary camera angles. If additional shooting or effects work is required, it can often be determined immediately rather than re-shooting days later when sets, locations or talent may no longer be available. It is also highly desirable to provide high-fidelity images for such daily review, particularly when considering technical problems such as lighting, color consistency, or continuity errors.

The use of digital cameras in cinematography has led to the employment of different production methods and techniques. Traditional filmmaking favored a somewhat centralized approach to production steps that occurred following image capture by a camera. Production steps such as editing, color grading, and visual effects typically occurred in studios or other locations nearby to the filming location so that the film would not need to be physically transported long distances. Digital content capture, however, can take a more decentralized approach as professional digital cameras output provide large data sets that are transmitted and processed using computer technology. Data sets representing such video, can be transferred across communications lines or networks to various facilities or other end-points that further process the video via production steps such as editing, color grading, visual effects, and so on. These various facilities need not be physically nearby as data may be transmitted across long distances.

The advantages of a decentralized approach to digital cinematography are many. For example, content creators and reviewers (e.g., directors, producers, and executives) may participate in the production process while at the same time being located in different parts of the country or even the world. However, bandwidth and storage limitations of certain communication and computer technologies may impose obstacles that prevent this model form becoming a practical reality in some circumstances. File sizes output from digital cameras and computerized animation or visual effects tools can be quite large. While large data files can be transmitted in non-real-time over typical networks, visual review of such high-quality content is not possible since limited bandwidth does not permit transmission in real-time. Specialized communication lines such as dedicated fiber optic channels may be capable of transmitting these large files in an effective manner. However, limited-bandwidth connections as such are typically provided by the Internet may be insufficient. Thus, when only a limited-bandwidth connection is available at a certain facility or end-point, that facility or end-point may be not be usable in a practical manner.

Thus, there is a need in the motion picture creation process for more efficient transmission of large and high-quality content files across limited-bandwidth connections for review and quality control purposes. The following disclosure is directed to addressing this and other needs.

The information included in this Background section of the specification, including any references cited herein and any description or discussion thereof, is included for technical reference purposes only and is not to be regarded subject matter by which the scope of the invention as defined in the claims is to be bound.

BRIEF DESCRIPTION OF THE DRAWINGS

FIG. 7 is a flow chart that illustrates of an overall process of linking a video segment to a high-fidelity content source in accordance with the present disclosure.

FIG. 8 is a simplified block structure for a computing device that may be used with the network or integrated into one or more of the network components is shown in FIG. 1 or FIG. 7.

SUMMARY

Figure 1:
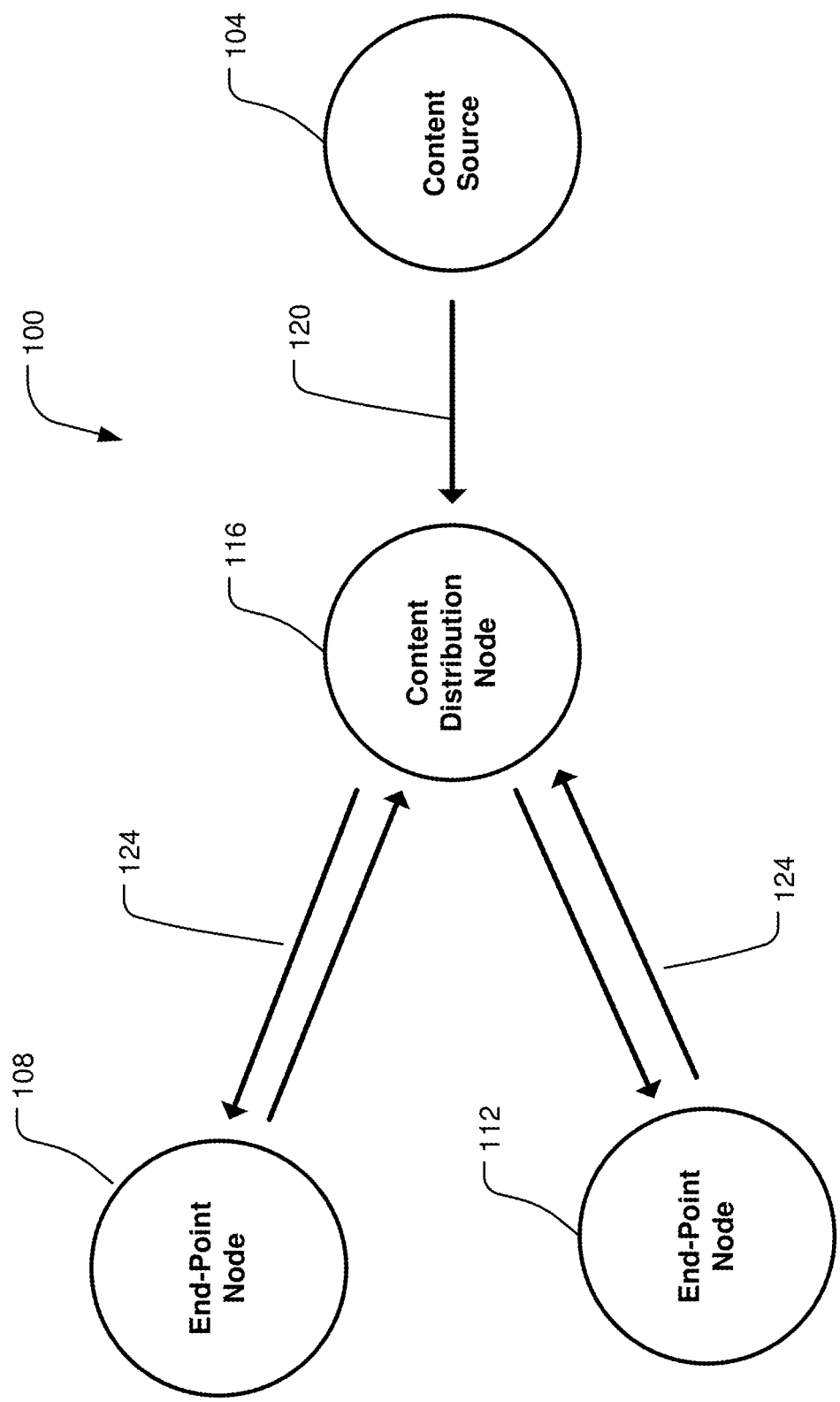
FIG. 1 is a schematic diagram that shows a network configuration in accordance with the present disclosure.

In one exemplary implementation disclosed herein, a method of using a content distribution node to provide content from the content distribution node to an endpoint node within a distributed computer network allows the end-point node to change a frame of content from a lower fidelity to a full high-fidelity frame. The content distribution node transmits a nominal variant of a high-fidelity content to the end-point node while a presentation function remains engaged at the end-point node. The content distribution node receives an indication that the presentation function is disengaged at the end-point node and that presentation of the nominal variant is paused on a particular frame. Transmission of the nominal variant of the high-fidelity content from the content distribution node is paused upon receipt of the indication. The content distribution node then transmits to the end-point node high-fidelity frame information of the high-fidelity content that corresponds to the particular frame of the nominal variant on which presentation is paused at the end-point node.

In another exemplary implementation, a method of presenting content at an end-point node within a distributed computer network allows the end-point node to change a frame of presented content from a lower fidelity to a full high-fidelity frame. A playback device presents a nominal variant of a high-fidelity content received from a content distribution node. When presentation of the nominal variant is paused at a particular frame, the end-point node transmits an indication of the particular frame of the nominal variant upon which presentation is paused to the content distribution node. The end-point node received high-fidelity frame information from the content distribution node that corresponds to the particular frame of the nominal variant on which presentation is paused. The end point node uses the high-fidelity frame information to transform the particular frame on which the presentation is paused into the full high-fidelity frame.

In a further implementation, a system for distributing content across a distributed computer network provides for changing a frame of presented content from a lower fidelity to a full high-fidelity frame. The system includes a content distribution node and an end-point node. The content distribution node is configured to transmit a nominal variant of a high-fidelity content to the end-point node and is further configured to transmit high-fidelity frame information of the high-fidelity content to the end-point node when an indication is received that presentation of the nominal variant is paused at the end-point node. The end-point node is coupled to the content distribution node across a limited bandwidth connection to receive the nominal variant and the high-fidelity information from the content distribution node over the limited bandwidth connection. The endpoint node is configured to present and pause the nominal variant; to transmit to the content distribution node an indication of a particular frame of the nominal variant upon which the presentation of the nominal variant is paused; and to use the high-fidelity frame information to transform the particular frame on which the presentation is paused into the full high-fidelity frame.

This Summary is provided to introduce a selection of concepts in a simplified form. These concepts and other examples are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

DETAILED DESCRIPTION

The following disclosure is directed to systems and methods for providing high-fidelity content across a limited-bandwidth connection. The high-fidelity content may be provided in the form of high-fidelity video. As used herein, the term "high-fidelity video" generally refers to digital video that is captured from a digital movie camera of the type used in digital cinematography. In some cases, the high-fidelity video may be the raw digital output provided by a digital movie camera. In other cases, the high-fidelity video may be digital video that has undergone one or more processing steps such as coloration, editing, visual effects, and so on. In all cases, the high-fidelity content is typically provided in large data files.

Systems and methods in accordance with the present disclosure may transmit high-fidelity content across a limited-bandwidth connection to one or more viewing end-points. In accordance with various embodiments, a viewing end-point may include or may be associated with various communication and/or computing equipment that is capable of receiving and displaying the high-fidelity content. Computing equipment that may be associated with a viewing end-point may include a desktop, laptop, palmtop computer, cell phone, tablet or the like having a display device or display surface on which content may be presented. The viewing end-point may have functionality that allows for the content to be played, stopped, paused, scrubbed, zoomed and the like. The high-fidelity content may be provided to the viewing end-point from a distribution node that supports this end-point functionality by playing, pausing, and/or scrubbing in accordance with commands issued at the viewing end-point.

A viewing end-point in accordance with the present disclosure may receive the high-fidelity content in connection with executing one or more tasks associated with a digital cinematography production. For example, the viewing end-point may receive the high-fidelity video to approve or further process the high-fidelity video such as by editing, coloring, adding visual effects, and so on. Various production team members may be located at the viewing end-point and may use computing equipment associated with the end-point to carry out one or more of these tasks. In some cases, production team members that participate in a given task may be spread out across different locations. Here, the high-fidelity video may be sent to multiple viewing end-points, such as through a multicast. The distribution node may facilitate the multicast with one viewing end-point designated as the controlling end-point and the other viewing end-points participating in a passive manner.

In providing a multicast or other content transmission, the distribution node may process content from a high-fidelity source so that the content is amenable to transmission across a limited-bandwidth connection that may exist between the distribution node and the end-point. When a presentation mode is engaged at the end-point, the distribution node may generate a nominal variant of the high-fidelity content and transmit the nominal variant to the end-point node. When a pause mode is engaged at the end-point, the distribution node may generate one or more frame sets, each having a plurality of component frames. The distribution node may transmit frames sets to the end-point as they are generated at the distribution node.

FIG. 1 is a schematic diagram that shows a network 100 configuration in accordance with the present disclosure. The network 100 is generally configured to provide high-fidelity content from a content source 104 to at least one end-point node 108. The network 100 may be configured to provide high-fidelity content to additional end-points in some embodiments. One additional end-point node 112 is shown in FIG. 1 by way of example and not limitation. The network 100 may additionally include a content distribution node 116 that is generally configured to receive the high-fidelity content from the content source 104 and to distribute the content to the various end-point nodes 108, 112. FIG. 1 includes one content distribution node 116 by way of example and not limitation. It should be appreciated that embodiments in accordance with the present disclosure may include two or more content distribution nodes in some implementations.

The content distribution node 116 may transmit the high fidelity content to the various end-point nodes 108, 112 in connection with executing one or more tasks associated with a digital cinematography production. For example, the end-point nodes 108, 112 may receive the high-fidelity video to approve or further processes the high-fidelity video such as by editing, coloring, adding visual effects, and so on. In one specific example, the content distribution node 116 may transmit high-fidelity content in connection with a visual effects approval process. As used herein, "visual effects" or "VFX" generally refers to processes by which imagery is created or manipulated outside the context of a live action shot. Visual effects involve the integration of live-action footage and generated imagery to create environments which look realistic, but would be dangerous, expensive, impractical, or impossible to capture with live action.

In the visual effects approval example, the content source 104 may be a visual effects hub that receives and processes raw data provided as output from one or more digital camera in the course of a digital production. As part of the production schedule, these visual effects additions may require approval by various team members, sometimes on a daily basis. The network configuration of FIG. 1 allows these team members to perform these tasks at one or more remote locations. In this regard, the content source 104 may provide high-fidelity content in the form of high-fidelity video that has been enhanced by the addition of visual effects. The content distribution node 116 may receive this video from the content source 104 and transmit the video for visual effects approval at one or more end-points nodes 108, 112.

The content distribution node 116 may be coupled to the content source 104 through a high-bandwidth connection 120. The high-bandwidth connection 120 may be a private or proprietary communication channel that may be dedicated exclusively or substantially exclusively to communication between the content source 104 and content distribution node 116. In one embodiment, the content source 104 provides high-fidelity content at approximately 70 MB per frame. Thus, in order to effectively transmit frames of this size, the high-bandwidth connection 120 may have a dedicated capacity of approximately 14 Gbps or greater. In one example, the high-bandwidth connection 120 may be implemented through high-capacity fiber optical cables that are arranged between the physical locations associated with the content distribution node 116 and the content source 104. In another example, the high-bandwidth connection 120 may be implemented as a high-capacity satellite communication channel having an uplink from the content source 104 and a downlink to the content distribution node 116.

The content distribution node 116 may be coupled to one or more end-point nodes 108, 112 through a limited-bandwidth connection 124. The limited-bandwidth connection 124 typically is a communication channel that exists outside of the proprietary framework of the high-bandwidth connection 120 between the content source 104 and the content distribution node 116. In some embodiments, the limited-bandwidth connection 124 couples the content distribution node 116 to the end-point nodes 108, 112 through connections over public networks, such as the Internet. Thus, the limited-bandwidth connection 124 has the advantage of reaching end-points 108, 112 that are located at remote parts of the country or even the world.

The content distribution node 116 may be configured to transmit content to one end-point node 108. Continuing with the visual effects example, transmission to only one end-point node 108 may be used in the event that all visual effects teams member are located at one end-point node 108. In other embodiments, the content distribution node 116 may transmit video to multiple end-points 108, 112. In this example, visual effects team members may be spread across different locations. Here, the content distribution node 116 may be configured to distribute content to the end-point 108 through a multicast. As used herein, a "multicast" generally refers to a type of transmission in which content is provided by a source to a limited number of known end-points. In a multicast, data may be sent across a computer network such as the Internet to the various end-points at the same time. FIG. 1 illustrates a multicast where a content distribution node 116 sends data to two end-points node 108, 112 by way of example and not limitation. It should be appreciated that a content distribution node 116 in accordance with the present disclosure may transmit a multicast to greater numbers of end-points in other implementations.

A particular end-point point node 108 may control the distribution of content to itself and to other endpoints 112 in the network 100. Such an end-point node 108 may be referred to herein as a "controlling end-point node." By way of example, the end-point node identified with reference numeral 108 is designated as the controlling end-point. Continuing with this example, the end-point node identified with reference numeral 112 may be designated as a passive end-point node. As used herein, a "passive end-point node" is an end-point node that is configured to receive and view content subject to the control of the controlling node. It should be appreciated that a particular end-point node may be configured to function as a controlling end-point or a passive end-point node in different implementations.

Through commands issued to or sensed by the content distribution node 116, the controlling end-point node 108 may take various actions with respect to the content such as playing, pausing, stopping, scrubbing, zooming and so on. In one example, the controlling end-point node 108 may issue a PLAY command that causes the content distribution node 116 to present the media at a normal viewing speed. The controlling end-point node 108 may issue a PAUSE command to stop presentation of the content and to freeze presentation of the content on a particular frame. The controlling end-point 108 may also be configured to issue a STOP command that more completely stops presentation of the content such that a particular frame is not displayed in frozen or repeating manner.

The controlling end-point 108 may also be configured to issue "scrubbing" commands that move content in either a forward or backward direction. As used herein, "forward" and "backward" are directional terms that refer to the sequence of frames that make up a video (by way of example) and the progression through that sequence that occurs when the video is played. When a video plays in a manner in which it is intended to be viewed, the video progresses through its sequence of frames in a forward direction. When a video progresses through its sequence of frames in a direction opposite to the forward direction, the video progress in a backward direction. Thus, the controlling end-point 108 may issue a FORWARD scrub command that advances video content to frames that are ahead of the currently displayed frame. The controlling end-point 108 may also issue a REVERSE scrub command that moves video content backwards to frames that are behind the currently displayed frame. Following execution of the FORWARD or REVERSE commands, the video may pause or resuming playing depending on the implementation or user input.

The controlling end-point 108 may also be configured to issue "zooming" commands that focus the display of content on a particular area of a video frame. With reference to video as an example, a zoom command is typically issued when presentation of the video content is paused and a particular frame is continually displayed in a still manner. Here, the controlling end-point 108 may provide input that specifies a particular area of the displayed image. In response, display of the paused image may shift to presenting the specified area to the exclusion of areas in the paused image that are located outside of the specified area. More specifically, the specified area may be enlarged so that it takes up the entire area of the display screen or surface that is used to present the video content. A zoom command may be used by the controlling end-point node 108 so as to allow a viewer to focus on particular areas of a video image in greater detail.

Commands issued by the controlling end-point node 108 may be received and/or monitored by the content distribution node 116. The content distribution node 116 may take various actions to support the type and manner of content presentation that is specified by the commands issued at the controlling end-point 108. For example, the content distribution node 116 may transmit video frames, as needed, to the controlling end-point node 116 so as to provide for playing of video responsive to a presentation command issued at the controlling end-point node 108. As mentioned, the content distribution node 108 may provide video content in the form of a multicast that includes a controlling end-point node 108 that controls the multicast and at least one other end-point node 112 that passively participates in the multicast. Here, the passive end-point node 112 may be configured to mirror the display of video content as presented and controlled by the controlling end-point node 108. In order to support this mirroring function, the content distribution node 116 may be configured to transmit content to the passive end-point node 112, as well as to relay commands from the controlling end-point node 108 to the passive end-point node 112.

The content distribution node 116 may be configured to process the high-fidelity content received from the content source 104 into different configurations that are amenable to transmission across the limited-bandwidth connections that couple the content distribution node 116 to the end-point nodes 108, 112. In one respect, the content distribution node 116 may generate a nominal variant of the high-fidelity content. As used herein, a "nominal variant" generally refers to a version of a high-fidelity content that is reduced in size or fidelity by compression, removing pixels, or otherwise such that the content may be effectively transmitted and played from across a limited-bandwidth communication channel. The content distribution node 116 may transmit the nominal variant to the end-point nodes 108, 112 during a time when the controlling endpoint engages a PLAY operation.

The content distribution node 116 may also generate one or more lower-fidelity videos or video frames that may be effectively transmitted across the limited-bandwidth connection between the content distribution node 116 and the end-point nodes 108, 112. The content distribution node 116 may transmit the lower fidelity frames to the various end-points during a time when presentation of the content is stopped by the controlling end-point node 108. When the multicast is stopped, the content may be stopped on a particular content frame, which is based on the nominal variant and therefore at a low fidelity. The content distribution node 116 may bring this low fidelity image frame to full fidelity by sending a sequence of lower fidelity frames that when added together at an end-point, produce the high-fidelity image frame. This operation is discussed in greater detail in connection with FIG. 2.

Figure 2:
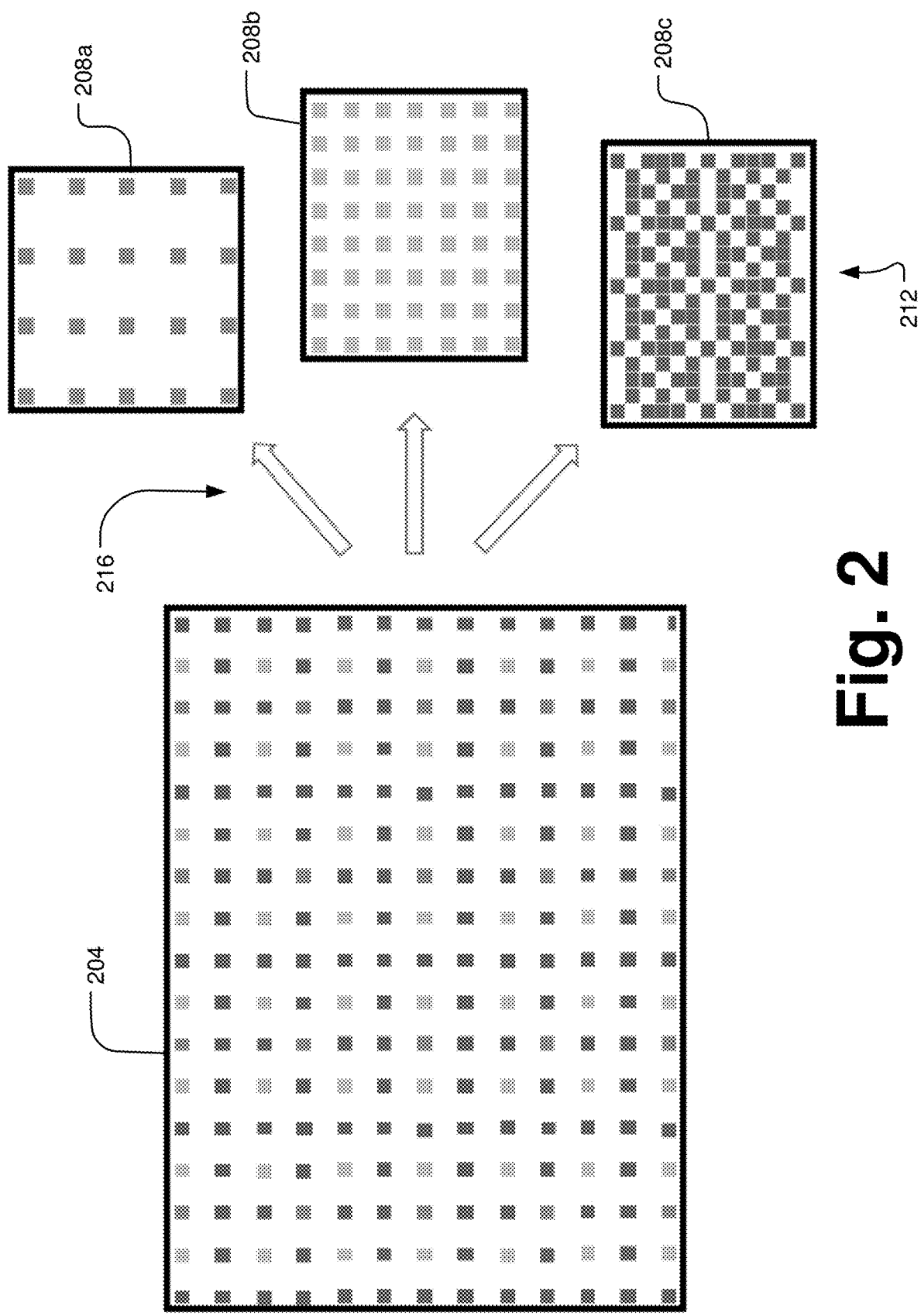
FIG. 2 is an illustration of an operation of a content distribution node in accordance with the present disclosure that processes an individual frame of high-fidelity content to generate a plurality of component frames.

FIG. 2 is an illustration of an operation of a content distribution node 116 that processes an individual frame of high-fidelity content in accordance with the present disclosure. The high-fidelity frame is generally identified with reference numeral 204. Continuing with the above example, the high-fidelity frame 204 may be an individual frame of high-fidelity content. As illustrated in FIG. 1, the high-fidelity frame 204 may be transmitted across a high-bandwidth connection 120 from a content source 104 for processing and distribution by a content distribution node 116. The content distribution node 116 may receive the high-fidelity frame 204 from the content source 104 in the form of a data set such as a file or other digital payload that specifies a color for each of a plurality of pixels. The data set may be used to form an image using an appropriate display device where the pixels are arranged in a grid and provide the underlying components of the image. The high-fidelity frame 204 shown in FIG. 2 is a representation of this arrangement of pixels. It should be understood that the high-fidelity frame 204 of FIG. 2 is an illustration that emphasizes the arrangement of pixels in a grid pattern and that an image rather than individual pixels would generally be visible when the high-fidelity frame 204 is displayed with an appropriate display device.

The data set provided by the content source 104 may specify colors for individual pixels of the high-fidelity frame 204 with reference to a particular color model. As used herein, a "color model" is a mathematical description of the visible color spectrum using tuples of numbers, typically three or four values that represent color components. In one example, the data set provided by the content source may reference the "RGB" color model where a particular color is represented with three numbers that represent an intensity value for the colors red, green and blue. In this example, the data set includes three values for each pixel in the frame 204. The number of pixels in the high-fidelity frame 204 may depend on the implementation. In one example, the content source 104 provides 4K video content at an aspect ratio of 1.89:1. In this example, a high-fidelity frame 204 includes 8.8 megapixels arranged in a grid having 2160 lines of 4096 pixels.

The content distribution node 116 may be configured to generate a set of component frames 208a-c based on the high-fidelity frame 204. A set of component frames is identified in FIG. 2 with reference number 212 and may be referred to herein as a "frame set." FIG. 2 illustrates an operation of the content distribution node 116 that generates a frame set 212 having three component frames 208a-c (collectively "component frames 208"). Thus, the frame set 212 of FIG. 2 may be referred to more specifically as a "3-component" frame set 212. FIG. 2 illustrates the content distribution node 116 generating three component frames 208a-c by way of example and not limitation. It should be appreciated that the content distribution node 116 may generate frame sets having greater or fewer numbers of component frames depending on the implementation.

As represented by arrows 216 in FIG. 2, the content distribution node 116 may generate a component frame 208 by selecting and assigning to the component frame a particular subset of pixels from the high-fidelity frame 204. In generating the 3-component frame set 212 of FIG. 2, the content distribution node 116 may select and assign to a first component frame 208a a first subset of pixels, select and assign to a second component frame 208b a second subset of pixels, select and assign to a third component frame 208c a third subset of pixels. For frame sets having different numbers of component frames, the content distribution node 116 may select and assign different numbers of pixel subsets. For example, the content distribution node 116 may select and assign two subsets of pixels for a 2-component frame set, four subsets of pixels for a 4-component frame set, five subsets of pixels for 5-component frame set, and so on.

The content distribution node 116 may generate the component frames 208 for a frame set 212 using all of the pixels from the high-fidelity frame 204. More specifically, the content distribution node 116 may assign each pixel of the high-fidelity frame 204 to at least one component frame 208 in the frame set 212. Because the content distribution node 116 uses all the pixels from the high-fidelity frame 204, the high-fidelity frame 204 may be reconstructed by adding together or otherwise merging the various component frames 208 that are included in a particular frame set 212. In some implementations, the content distribution node 116 may generate the component frames 208 by assigning each pixel from the high-fidelity frame 204 to one and only one component frame 208. In this implementation, the frame set 212 contains no redundancies between the various component frames 208 of the set. However, because each pixel from the high-fidelity frame 204 is included in one component frame, the high-fidelity frame 204 may still be reconstructed by adding together or otherwise merging the various component frames 208.

The content distribution node 116 may generate a frame set 212 using equal or unequal numbers of pixels for the various component frames 208 depending on the implementation. Taking the 3-component frame set 212 of FIG. 2 as an example, the first component frame 208a may have fewer pixels than the second component frame 208b, and the second component frame 208b may have fewer pixels than the third component frame 208c. In one specific implementation, the first component frame 208a may have one-sixth of the pixels from the high-fidelity frame 204, the second component frame 208b may have one-fourth of the pixels from the high-fidelity frame 204, and the third component frame 208c may have one-half of the pixels from the high-fidelity frame 204. FIG. 2 generally illustrates an example where component frames have unequal numbers of pixels. In other embodiments, the component frames may have equal or substantially equal numbers of pixels. Thus, in a 3-component frame example, the first component frame may have one-third of the pixels from the high-fidelity frame, the second component frame may one-third of the pixels from the high-fidelity frame, and the third component frame may have one-third of the pixels from the high-fidelity frame.

The content distribution node 116 may generate a frame set 212 by selecting pixels for the various component frames 208 in a uniform distribution over an area of the high-fidelity frame 204. Thus, in the example implementation of FIG. 2 that includes a frame set 212 with component frames 208 having unequal numbers of pixels, every group of six adjacent pixels in a given row of pixels in the high fidelity frame 204 may have one pixel assigned to the first component frame 208a, two pixels assigned to the second component frame 208b, and three pixels assigned to the third component frame 208c. By way of further example, in the case of a frame set with component frames having equal number of pixels, every group of six adjacent pixels in a given row of pixels may have two pixels assigned to the first component frame, two pixels assigned to the second component frame, and two pixels assigned to the third component frame.

The content distribution node 116 may be generally configured to select pixels for the various component frames 208 over the entire area of the high-fidelity frame 204. For example, the content distribution node 116 may select pixels for assignment to component frames in a row-by-row manner beginning at top left-hand corner of the high-fidelity frame 204 and ending at the lower right-hand corner of the high-fidelity frame 204. Pixels may be picked over the entire area of the high-fidelity frame 204 when presentation is paused at the end-point node 108 without input being provided to focus on a specific area. However, in some cases, the content distribution node 116 may select pixels for the various component frames 208 over less than the entire area of the high-fidelity frame 204. For example, the content distribution node 116 may generate component frames that focus on a particular area of the high-fidelity image 204. In this example, pixels may be picked over less than all of the area of the high-fidelity frame when is presentation is paused at the end-point node 108 and a zoom command provided that focuses on a specific area of the frame. The particular area of focus may be specified by appropriate pixel coordinates, such as by corners of the focal area or the like. This process of selecting component frames corresponding to less than all of the area of the high-fidelity frame is described in greater detail with reference to FIG. 3.

Figure 3:
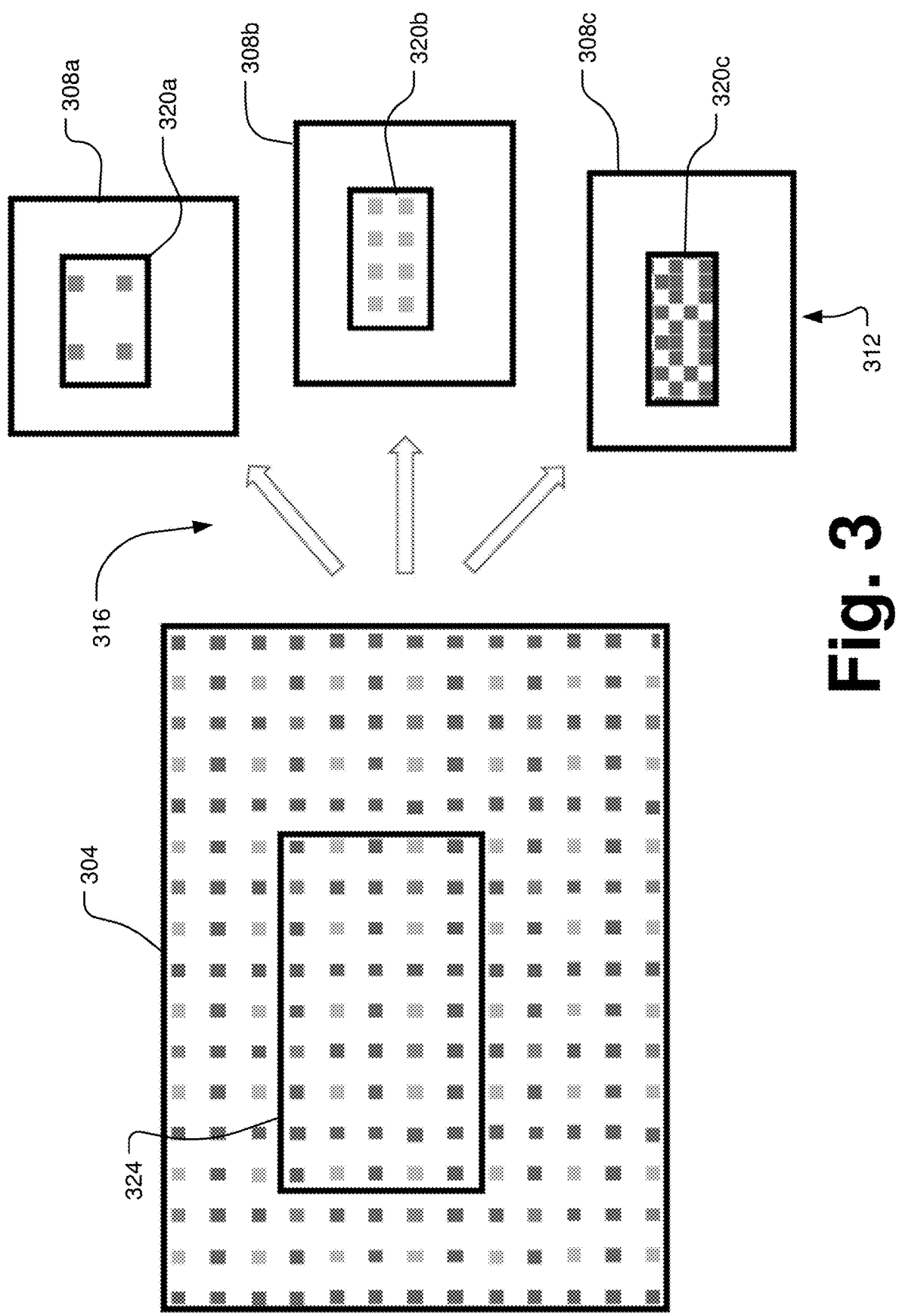
FIG. 3 is an illustration of an operation of a content distribution node in accordance with the present disclosure that processes an individual frame of high-fidelity content to generate a plurality of sub-component frames.

FIG. 3 is an illustration of an operation of a content distribution node 116 that processes an individual frame 304 of high-fidelity content in accordance with the present disclosure. The high-fidelity frame 304 may correspond to the high-fidelity frame 204 of FIG. 2. Thus, as described in greater detail above, the high-fidelity frame 304 may be an individual frame of high-fidelity video, may be received from the content source 104, may be in the form of a data set that specifies a color for each of a plurality of pixels, and so on. As shown in FIG. 3, the content distribution node 116 may generate a frame set 312 that includes a plurality of component frames 308a-c. In contrast to the operation illustrated in FIG. 2, the component frames 308 of FIG. 3 include pixels in an area that is less than the total area of the high-fidelity frame 304 frame from which the component frames 308 were generated. Stated another way, the component frames 308 of FIG. 3 include smaller, sub-component frames 320a-c that are populated with pixels. Areas that are within the component frames 308, but outside of the sub-component frame 320 are not with populated pixels. The area of the sub-component frames 308 may correspond to a particular designated area 324 within the high-fidelity frame 304.

The pixels within the area of the various sub-frames 320 of FIG. 3 may be otherwise similar to the corresponding area within the component frame 308 of FIG. 2. Thus, as represented by the arrows 316 in FIG. 3, the content distribution node 116 may generate a sub-component frame 320 by selecting and assigning to the sub-component frame a particular subset of pixels from the designated area 324 within the high-fidelity frame 304. In generating the 3-sub-component frame set 312 of FIG. 3, the content distribution node 116 may select and assign to a first sub-component frame 320a a first subset of pixels, select and assign to a second sub-component frame 320b a second subset of pixels, select and assign to a third sub-component frame 320c a third subset of pixels. The various features and characteristics described above in connection with component frames 308 may also apply to sub-component frames 320. Thus, sub-component frame sets may have different numbers of sub-frames such as two, four, five, and so on. The content distribution node 116 may generate sub-component frames 320 using all pixels in the designated area 324 of the high-fidelity frame 304, may generate a sub-component frame set 320 using equal or unequal numbers of pixels for the various sub-component frames 320 depending on the implementation, may generate a sub-component frame set 312 by selecting pixels for the various sub-component frames 308 in a uniform distribution, and so on.

Component frames and/or sub-component frames generated by the content distribution node 116 may be regarded as lower-fidelity versions of the high-fidelity frame or portion thereof from which they were generated. Taking the 3-component frame set 212 of FIG. 2 as an example, the first component frame 208a may be regarded as a lower-fidelity version of the high-fidelity frame 204 from which the first component frame was generated. More specifically, the first component frame 208a may be output by an appropriate display device to form a lower fidelity version of the image of the high-fidelity frame 204. Further, two different component frames, such as the first and second component frames 208a, 208b, may be combined to form an image having a higher fidelity than each of the two component frames 208a, 208b considered individually. The resulting image may still lack the pixels assigned to the third component frame 208c and so may have a lesser fidelity as compared to the high-fidelity frame 204. Finally, the first, second and third component frames 208a-c may be combined to form an image having a fidelity equal to that of the higher-fidelity frame.

This process of combining component frames or sub-component frames together may be used by a content distribution system in accordance with the present disclosure to progressively bring a low fidelity image to full fidelity. Referring to the network configuration of FIG. 1, the low fidelity image that is to be brought to full fidelity may be an image that is presented by a display device associated with one or more end-point nodes 108, 112. An end-point node 108 may have the low fidelity image presented in connection with playing a video feed received from the content distribution node 116. The video feed may be received at the end-point node 108 as part of a multicast that is provided by the content distribution node 116. The content distribution node 116 may provide the video feed in the form of a nominal variant of a high-fidelity video when the video is presented at normal speed at the end-point node 108. Normal speed presentation of the nominal variant may be paused at the end-point node 108 resulting in the continual display of an individual frame that is derived from the nominal variant. It is this continually presented frame that may be brought to full fidelity through a process of combining frames in accordance with embodiments of the present disclosure.

The continually presented frame may be at less than full fidelity because the nominal variant from which the frame is derived is itself at less than full fidelity. The content distribution node 116 may generate the nominal variant through compression or other suitable processing techniques that reduce file size or otherwise provide for effective transmission across a limited-bandwidth connection that may exist between the content distribution node 116 and the end-point node 108. This processing may involve steps that reduce the fidelity of the nominal variant such as removing pixels, interpolating pixels in some areas, and so on. Thus, a given frame in the nominal variant may have a lesser fidelity in comparison to the corresponding frame in the high-fidelity video. When presentation of video is paused at the end-point node 108 and a particular frame continually displayed, the content distribution node 116 may refrain from sending additional nominal variant frames as the additional frames are not currently being called for by the end-point node 108. The content distribution node 116 may instead send data representing all pixels in the high-fidelity frame corresponding to the particular frame that is currently presented in a continual manner. As described in connection with FIG. 2, the content distribution node 116 may send the high-fidelity frame data in the form of a plurality of component frames 208 that together make up a frame set 212. The high-fidelity frame may then be used by production team member in the editing or approval process. Specifically, team members may pause the presentation of the nominal variant, which may be presented at a lower fidelity because finer image details may not be needed at that point. The paused image may then be brought to full fidelity so that finer details may be visible when needed.

The content distribution node 116 may be configured to generate a frame set 212 when the content distribution node 116 determines that presentation of content at the end-point node is paused. When the content distribution node 116 senses a pause, the content distribution node 116 may switch from transmitting a nominal variant of the high-fidelity content to generating at least one frame set 212. The frame set 212 generated at this point may include component frames 208 that correspond to the frame that is currently paused and continually presented at the end-point node 108. Once the component frames 208 are generated, the frames 208 may be sent one after the other from the content distribution node 116 to the end-point node 108. The component frames 208 may be presented as they are received by the end-point node 108. The end-point node 108 may merge newly received component frames with previously received component frames and display the frames together as a combined image. In the way, end-point node 108 adds together component frames as they are received so as to progressively bring the paused frame to full fidelity.

When the content distribution node 116 senses a zoom command, the content distribution node 116 may switch to generating at least one sub-component frame set 312. The sub-component frame set 312 generated at this point may include sub-component frames 320 that correspond to the designated area 324 of the content frame that is currently paused and continually presented at the end-point node 108. Once the sub-component frames 320 are generated, the sub-component frames 320 may be sent one after the other from the content distribution node 116 to the end-point node 108. The sub-component frames 320 may be presented as they are received by the end-point node 108. The end-point node 108 may merge newly received sub-component frames 320 with previously received sub-component frames 320 and display the frames together as a combined image that is focused on the designated area 324. In the way, end-point node 108 adds together sub-component frames as they are received so as to progressively bring the paused frame focused on the designated area 324 to full fidelity. Once the designated area is brought to full fidelity, the content distribution node 116 may generate additional sub-component frames corresponding to areas outside of the designated area 324 in anticipation that the focus area of the zoom will shift.

Using component frames to bring a paused image to full fidelity provides for a smooth transition from low fidelity to high-fidelity. As this change occurs progressively as component frames are received by an end-point node, the change may occur somewhat imperceptively or at least without rough transitions that may occur with other methods. In some embodiments, the paused image may be brought to full fidelity at a constant rate. A paused image may be brought to full fidelity at a constant rate in those implementations where component frames are generated using equal number of pixels in the various frames. In other embodiments, the paused image may be brought to full fidelity slowly at first and then at an increasing speed. A paused image may be brought to full fidelity in this manner in those implementations where component frames are generated using unequal numbers of pixels in the various frames. In those implementations where the content distribution node 116 generates a frame set 212 by selecting pixels for the various component frames 208 in a uniform distribution over the entire area of the high-fidelity frame 204, lower-fidelity image of a particular component frame 208 in the frame set may have a uniform level of fidelity across the various areas of the image.

Sharp boundaries between different regions within an image may be an obstacle to smooth transitions in some cases. A sharp boundary of this kind may be present when one or more objects are present in the frame image. For example, a sharp boundary may be present at an edge of an object where the object meets another area of the image such as the background. When the image is in the process of being brought from low fidelity to full fidelity and the image is still at a relatively low fidelity, this boundary may become suddenly visible resulting in a jarring change in the image. In order to avoid this disadvantage, present embodiments may withhold for later transmission pixels that are located at sharp boundaries between contrasting portions of a frame image. Pixels located at these sharp boundaries may be identified using edge detection algorithms. Pixels identified in this manner may be withheld from one or more component frames and rescheduled for transmission at a time when the image is closer to full fidelity. In this way, sharp edges may be added to the image as a last step in bringing the image to full fidelity. Adding the sharp edges at this time may result in a less jarring change in the image and thus a more desirable experience for the viewer. This process is described in greater detail with reference to FIG. 4.

Figure 4:
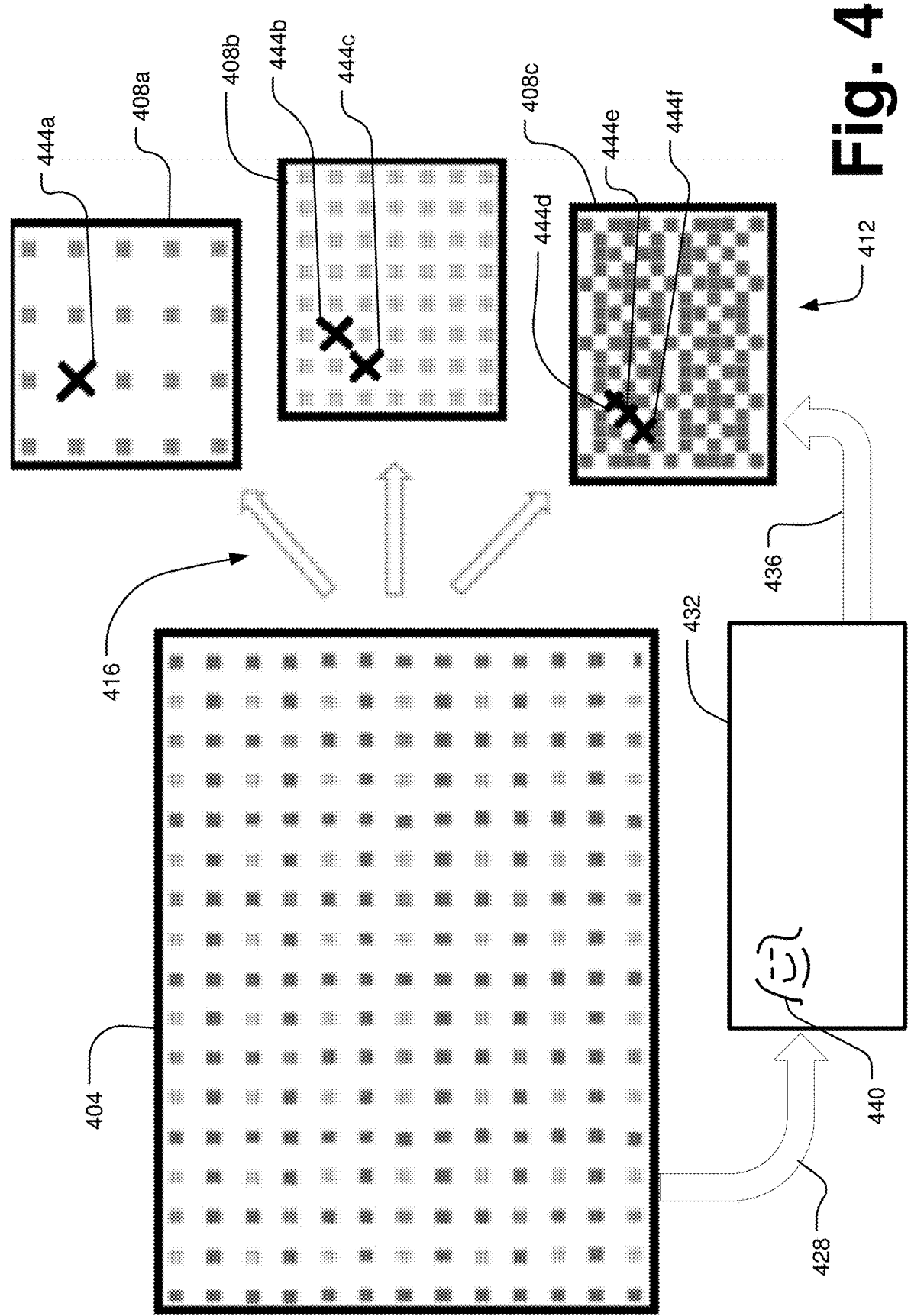
FIG. 4 is an illustration of an operation of a content distribution node in accordance with the present disclosure that processes an individual frame of high-fidelity content to generate a plurality of component frames having certain pixels withheld therefrom based an edge-detection algorithm.

FIG. 4 is an illustration of an operation of a content distribution node 116 that processes an individual frame 404 of high-fidelity content in accordance with the present disclosure. The high-fidelity frame 404 may correspond to the high-fidelity frame 204 of FIG. 2. Thus, as described in greater detail above, the high-fidelity frame 404 may be an individual frame of high-fidelity content, may be received from the content source 104, may be in the form of a data set that specifies a color for each of a plurality of pixels, and so on. As shown in FIG. 4, the content distribution node 116 may generate a frame set 412 that includes a plurality of component frames 408. As represented by the arrows 416 in FIG. 4, the content distribution node 116 may generate a component frame 408 by selecting and assigning to the component frame a particular subset of pixels from the high-fidelity frame 404. In generating the 3-component frame set 412 of FIG. 4, the content distribution node 116 may select and assign to a first component frame 408a a first subset of pixels, select and assign to a second component frame 408b a second subset of pixels, select and assign to a third component frame 408c a third subset of pixels. Additionally, the content distribution node 116 may generate component frames 408 using all pixels in the high-fidelity frame 404, may generate the component frame set 412 using equal or unequal numbers of pixels for the various component frames 408 depending on the implementation, may generate a component frame set by selecting pixels for the various component frames 408 in an uniform distribution, and so on.

In addition to these features, the content distribution node 116 operations illustrated in FIG. 4 includes applying an edge detection function or algorithm to selectively withhold one or more pixels that would otherwise be assigned to a particular component frame 408. As represented by arrow 428 in FIG. 4, the content distribution node 116 may apply an appropriate edge detection function or algorithm to the high-fidelity frame 404. In one embodiment, the content distribution node 116 may apply an edge detection function such as Sobel-Feldman operator or the like. The resulting output is represented in FIG. 4 by a filter frame 432. The edge-detection function may be generally configured to generate the filter frame 432 by a process that enhances or otherwise emphasizes pixels that are located at a boundary between contrasting areas of the frame image. Other content is deemphasized or otherwise removed from the filter frame 432. The resulting output then may be provided as a filter frame 432 having lines traced along edges or other boundary lines that are contained in the frame image.

As represented by arrow 436 in FIG. 4, the content distribution node 116 may apply the filter frame 432 to the component frames 408 so as to selectively remove or withhold pixels that were previously assigned or that may be assigned to a component frame 408. More specifically, the content distribution node 116 may compare the location of pixels emphasized in the filter frame 432 to the location of pixels in the various component frames 408. A pixel in a component frame 408 having the same location as a pixel in the filter frame 432 may be removed from the component frame 408 such that the pixel is withheld for later transmission when the component frame 408 is transmitted from the content distribution node 116 to an end-point node 108. For example, consider a first edge 440 that is included in the filter frame 432 image. The first edge 440 may include a plurality of pixels having locations matching the locations of various pixels included in the component frames 408. In this example, the frame set 412 includes six pixels that have locations that match the location of a pixel included in the first edge 440. As shown in FIG. 4, a first such matching pixel 444a is included in the first component frame 408a. Second and third matching pixels 444b, 444c are included in the second component frame 408b. Fourth, fifth, and sixth matching pixels 444d, 444e, 444f are included in the third component frame 408c. As indicated in FIG. 4, these six pixels 444a-f may be removed from the component frames 408 before the component frames are transmitted from the content distribution node 116 to an end-point node 108.

The content distribution node 116 may initially withhold pixels from transmission based on edge detection, but may schedule these pixels for transmission to an end-point node 108 once transmission of the component frames is complete. In this way, the pixels identified by edge detection may be transmitted to the end-point node 108 at a time when the image presented there is closer to full fidelity. In this way, sharp edges may be added to the image as a last step in bringing the image to full fidelity. Adding the sharp edges at this time may result in a less jarring change in the image and thus a more desirable experience for the viewer. In some embodiments, algorithms may be applied to the scheduling of withheld pixels so as to further minimize the jarring effect of sharp edges in the process of bringing a low fidelity image to full fidelity. An example scheduling algorithm is described in connection with FIG. 5.

Figure 5:
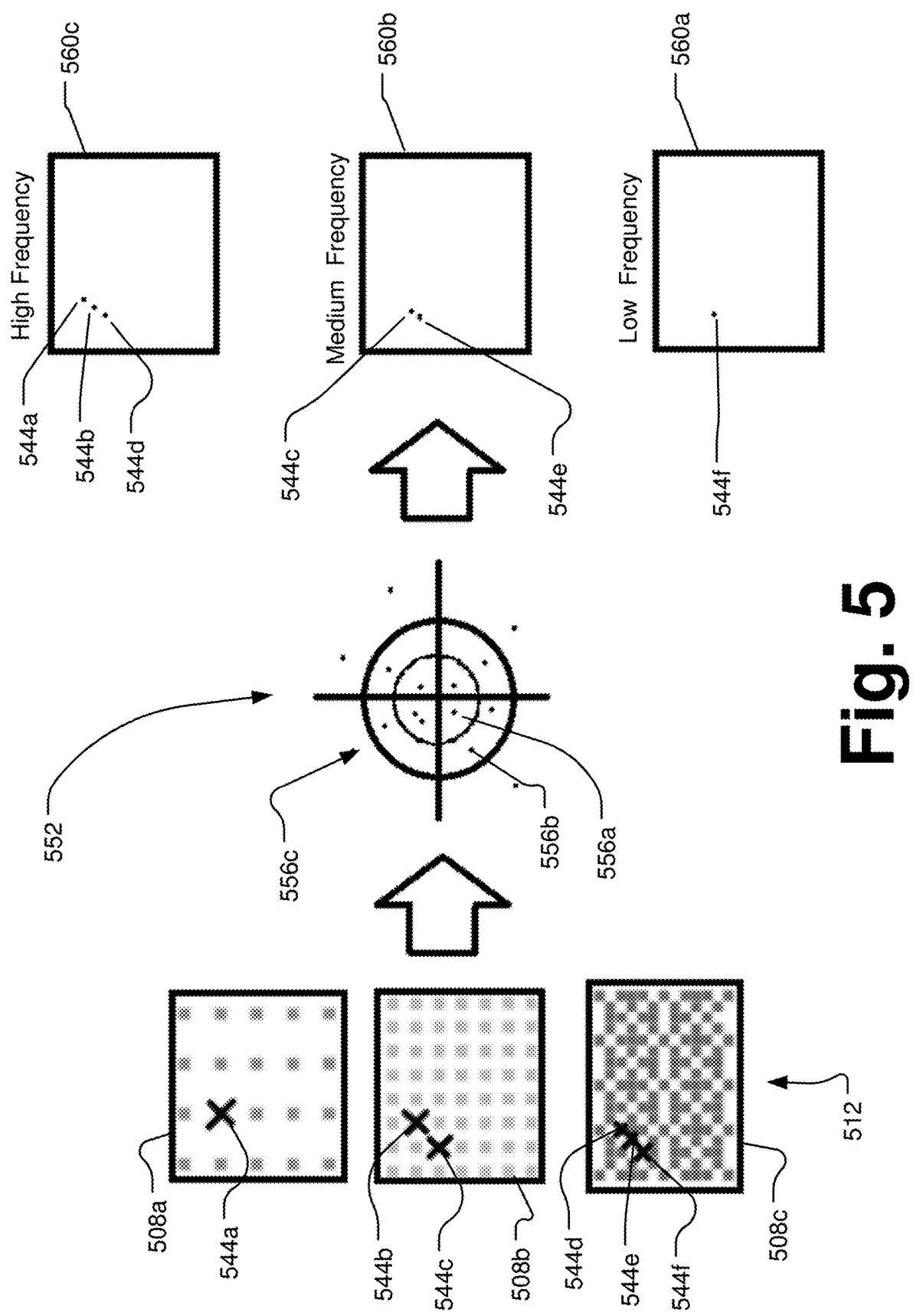
FIG. 5 is an illustration of an operation of a content distribution node for scheduling transmission of withheld pixels in accordance with the present disclosure.

FIG. 5 is an illustration of an operation of a content distribution node 116 for scheduling transmission of withheld pixels in accordance with the present disclosure. FIG. 5 includes a plurality of component frames 508 that each have at least one pixel that is to be withheld when the component frame is transmitted from the content distribution node 116 to the end-point node 108. The component frames 508 and withheld pixels may correspond to those illustrated in FIG. 4. Thus, the withheld pixels of FIG. 5 may be identified via an edge detection algorithm or the like. The pixel scheduling operations illustrated in FIG. 5 include a first operation of applying a frequency filter to the high-fidelity frame (shown in FIG. 4) from which the component frames 508 were derived. The frequency filter is represented graphically in FIG. 5 and is generally identified with reference number 552. The output of this frequency filter 552 may be used to assign the withheld pixels to different bins 560a-c, each of which may be scheduled for transmission to an end-point node at different times.

A frequency filter 552 in accordance with the present disclosure may be generally configured to process a high-fidelity frame and to assign a frequency to various pixel colors based on the frequency with which the pixel color appears in the high-fidelity frame. As mentioned, each pixel of the high-fidelity frame may be associated with a data set having a group of numbers that specify intensity values with reference to a particular color model. For example, when the RGB color model is used, each pixel of the high-fidelity frame may be represented by a three-number group where a first number represents a red intensity value, a second number represents a green intensity value, and a third number represents a blue intensity value.

In at least one embodiment, the frequency filter 552 may cycle through all possible colors and compare each color to the high-fidelity frame to determine the number of times that the color appears in the frame. In cycling through all possible colors, the frequency filter may cycle through all possible permutations of the intensity values used to specify particular colors in the color model used for the high-fidelity frame. Based on the number of times that each color appears in the high-fidelity frame, the frequency filter 552 may assign a frequency to each possible color. All of the possible colors in the color model may then be organized into bands based on the frequency with which they appear in the high-fidelity frame. These frequency bands are included in the graphical representation of the frequency filter 552 that is provided in FIG. 5. By way of example, the frequency filter 552 may include three frequency bands 556a-c representing low, medium and high frequencies respectively.

Once the frequency filter 552 has been applied to the high-fidelity frame, the resulting output may be used to schedule transmission of withheld pixels. In at least one embodiment, scheduling transmission of withheld pixels may include assigning each of the withheld pixels to a particular bin 560 based on the output of the frequency filter 552. Each withheld pixel may be compared to the frequency filter 552 output to determine which frequency band contains the pixel's color. Withheld pixels having a color in the low frequency band 556a may be assigned to the first pixel bin 560a. Withheld pixels having a color in the medium frequency band 556b may be assigned to the second pixel bin 560b. Withheld pixels having a color in the high frequency band 556c may be assigned to the third frequency band 560c.

By way of example, FIG. 5 illustrates an instance where the first pixel 544a, which is associated with the first component frame 508a, is assigned to the high frequency bin 560c. The second pixel 544b, which is associated with the second component frame 508ba, is assigned to the high frequency bin 560c. The third pixel 544c, which is associated with the second component frame 508b, is assigned to the medium frequency bin 560b. The fourth pixel 544d, which is associated with the third component frame 508c, is assigned to high frequency bin 560c. The fifth pixel 544e, which is associated with the third component frame 508c, is assigned to the medium frequency bin 560b. The sixth pixel 544f, which is associated with the third component frame 508c, is assigned to the low frequency bin 560a. Once the withheld pixels are assigned to bins 560a-c, the pixels may be scheduled for transmission from the content distribution node 116 to an end-point node 108 on a bin-by-bin basis.

A higher frequency pixel (i.e. a pixel having a color that more frequently appears in the high-fidelity frame) is more likely to be adjacent to a pixel of the same or similar color in the frame as compared to a lower frequency pixel (i.e. a pixel having a color that less frequently appears in the frame). Accordingly, when a higher frequency pixel is added to an image that is being brought to full fidelity, the likelihood that the addition of the pixel will cause a jarring or otherwise noticeable effect is less in comparison to the case when a lower frequency pixel added. Thus, in order to minimize the potential for jarring or otherwise noticeable transitions as an image is brought from low fidelity to full fidelity, present embodiments may prioritize higher frequency pixels over lower frequency pixels when scheduling transmission of pixels originally withheld based on edge detection. Thus, in the example of FIG. 5, the content distribution node 116 may first transmit the pixels in the high frequency bin 560c, followed by the pixels in the medium frequency bin 560b, and followed finally by pixels in the low frequency bin 560c.

The content distribution node 116 may send component frames until a full frame set is sent and the frame that is paused and continually presented at the end-point node is brought to full fidelity. Once this occurs, the content distribution node 116 may proceed to send frame sets for content frames that are adjacent to the content frame that is paused and continually presented at the end-point node. As used herein, "adjacent" content frames are those content frames that occur before or after a particular content frame. The content distribution node 116 may send frames set for adjacent frames in anticipation of the execution of scrubbing operation at the end-point node. In this way, full fidelity images are available in the event that scrubbing commands are executed. This procedure is described in greater detail with reference to FIG. 6.

Figure 6:
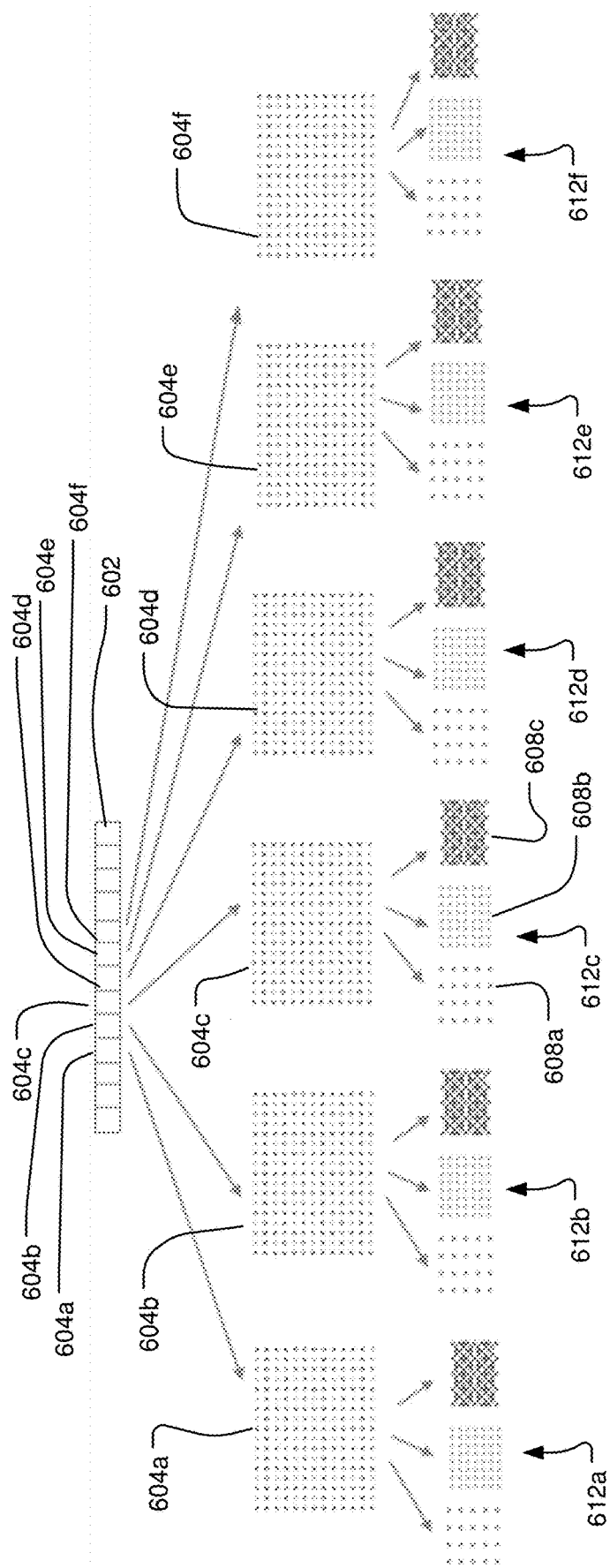
FIG. 6 is a schematic illustration of a group of operations that may be executed by a content distribution node in accordance with the present disclosure.

FIG. 6 is a schematic illustration of a group of operations that may be executed by a content distribution node 116 in accordance with the present disclosure. FIG. 6 includes a content segment 602 that includes a plurality of frames 604*a-f* (collectively "frames 604"). The content segment 602 illustrated in FIG. 6 may correspond to the high-fidelity content that is received at the content distribution node 116 across the high-bandwidth connection 120 from the content source 116. The content distribution node 116 may process the content for transmission across a limited-bandwidth connection 124 that may exist between content distribution node 116 and one or more end-point node 108, 112. When the content is presented at regular speed at an end-point node 108, the content distribution node 116 may generate a nominal variant of the high-fidelity content and transfer the nominal variant across the limited-bandwidth connection where it is presented by an appropriate display device at the end-point node 108. When presentation of the content is paused at the end-point node 108, the content distribution node 116 may generate one or more component frames that may be transmitted across the limited-bandwidth connection where they may be used to bring one or more low fidelity frames to full fidelity. The latter operation is illustrated in FIG. 6.

The content segment 602 of FIG. 6 may be defined by the location within the overall content at which presentation of the content is paused at the end-point node 108. More specifically, the content segment 602 may include a center frame 604*c*, defined as the specific frame on which the content is paused at the end-point node 108. The content segment 602 may additionally include forward frames 604*d-f* that, with respect to the progression of frames in the content, are ahead of the center frame 604*c*. The content segment 602 may additionally include rearward frames 604*a-b* that, with respect to the progression of frames in the content, are behind the center frame 604*c*. When the content distribution node 116 senses that presentation of the content is paused at the end-point node 108, the content distribution node 116 may shift from generating a nominal variant of the high-fidelity content to generating one or more component frames. The content distribution node 116 may begin generating component frames based the center frame 604*c* and then later shift to generating component frames based on either or both of the forward or rearward frames 604*d-f*, 604*a-b*.

As illustrated in FIG. 6, the content distribution node 116 may generate component frames beginning with the frame on which presentation of the content stopped at the end-point node 108. By way of example, the content distribution node 116 may begin generating component frames starting with the center frame 604*c*. Once the content distribution node 116 generates a full frame set 612*c* for the center frame 604*c*, the content distribution node 116 may shift to generating component frames for content frames 604*d-f*, 604*a-b* that are ahead or behind the center frame 604*c*. In some embodiments, the content distribution node 116 may alternate between forward frames 604*d-f* that are ahead of the center frame 604*c* and rearward frames 604*a-b* that are behind the center frame 604*c*. Thus, once a full frame set 612*c* is generated for the center frame 604*c*, the content distribution node 116 may generate a full frame set 612*d* for a first forward frame 604*d*, then generate a full frame set 612*b* for a first rearward frame 604*b*, then generate a full frame set 612*e* for a second forward frame 604*e*, then generate a full frame set 612*a* for a second rearward frame 604*a*, then generate a full frame set 612*f* for a third forward frame 604*f*, and so on.

In other embodiments, the content distribution node 116 does not alternate between forward and rearward frames. Here, the content distribution node 116 may generate component frames beginning with the frame on which presentation of the content is paused at the end-point node 108. By way of example, the content distribution node 116 may begin generating component frames starting with the center frame 604*c*. Once the content distribution node 116 generates a full frame set 612*c* for the center frame 604*c*, the content distribution node 116 may shift to generating component frames for forward frames 604*d-f* that are ahead of the center frame 604*c*. Alternatively, once the content distribution node 116 generates a full frame set 612*c* for the center frame 604*c*, the content distribution node 116 may shift to generating component frames for rearward frames 604*a-b* that are behind of the center frame 604*c*. Whether the content distribution node 116 shifts to generating component frame for forward frames 604*d-f*, rearward frames 604*d-f*, or alternates between the two may be decided by various mechanisms such as user settings, historical use data, and so on. Embodiments in accordance with the present disclosure may also include settings that specify the number of frames (in forward direction, rearward direction, or both) that are loaded and stored at an endpoint at a given time. These settings may be based on the memory capacity of the endpoint node or other factors.

Initially, presentation of the content at the end-point node 108 may pause at a particular content, defined in FIG. 6 as the center content 604*c*. The user's viewing experience of the center frame 604*c* may be enhanced as the center frame 604*c* is brought to full fidelity via component frames 608*a-b* received by the content distribution node 116. The content distribution node 116 may then generate frame sets for forward and/or rearward frames 604*d-f*, 604*a-b* in anticipation of a scrubbing action at the end-point node 108. More specifically, the user at some point may wish to view additional frames that are proximate to the center frame 604*c*. For example, the user may engage a scrubbing function to advance or rewind the content to a point corresponding to a forward frame 604*d-f* or a rearward frame 604*a-b*. If the user stops on a frame for which the end-point node 108 has received one or more component frames, the end-point node 108 may immediately display the frame at a higher fidelity than would be available from the nominal variant alone. If a full frame set has been received, the end-point node 108 may immediately display the frame at full fidelity.

A given component frame may be transmitted from the content distribution node 116 to the end-point node 108 once the component frame is generated by the content distribution node 116. For example, once the content distribution node 116 senses that presentation of the content is paused at the end-point node 108, the content distribution node 116 may begin generating a frame set 612*c* for the center frame 604*c*, on which the presentation of the content is paused. Here, the content distribution node 116 may begin by generating a first component frame 608*a* for the frame set 612*c*. In some embodiments, the first component frame 608*a* may be immediately transmitted from the content distribution node 116 to the end-point node 108 once the first component frame 608a is generated. In this way, the first component frame 608a may be sent to the end-point node 108 in parallel with the content distribution node 116 generating the second component frame 608b of the frame set 612c. In other embodiments, the content distribution node 116 may generate the full frame set 612c prior to transmitting a particular component frame belonging to the frame set 612c.

FIG. 7 is a flow chart 700 that illustrates of an overall process of linking a content segment to a high-fidelity content source in accordance with the present disclosure. The flow chart 700 includes a source node 704 having a high-fidelity content source. The source node 704 may correspond to the content source 104 of FIG. 1. In one embodiment, the high-fidelity content source may be a high-fidelity content 708 that includes a plurality high-fidelity content frames 712. The source node 716 may be coupled to a content distribution node 716, which may, in turn, be coupled to an end-point node 720. The content distribution node 716 may correspond to the content distribution node 116 of FIG. 1. The end-point node 720 may correspond to the end-point node 108 of FIG. 1. The content distribution node 716 may receive and process the high-fidelity content 708 for transmission to the end-point node 720. When a presentation mode is engaged at the end-point node 720, the content distribution node 716 may generate a nominal variant 724 of the high-fidelity content 708 and transmit the nominal variant 724 to the end-point node 720. When a pause mode is engaged at the end-point node 720, the content distribution node 716 may generate one or more frame sets 728, each having a plurality component frames 732a-c (collectively "component frames 732"). The content distribution node 716 may transmit frames sets 728 to the end-point node 720 as they are generated at the content distribution node 716. In one embodiment, the content distribution node 716 may transmit component frames 732 of a frame set 728 in order from lowest fidelity to highest fidelity.

As shown in FIG. 7, the end-point node 720 may include a display device 736 that may be used to present the content for viewing. The display device 736 may be implemented as a desktop computer, a laptop computer, a tablet computer, a palm top computer, cellular phone or the like. In some embodiments, the display device 736 may implemented as a set-top box that is provided in association with a television, monitor or other display surface. In each of the possible implementations, the display device 736 may include a processor, a memory and other computing device components. The display device 736 may be configured to execute various processor-implemented functions such as receiving and processing communication from the content distribution node, providing output for presentation on a display surface, merging component frames 732 to progressively bring a low-fidelity image to full fidelity, and so on.

The memory may be configured to store processor-executable code that may be executed to carry-out the various processor-implemented functions discussed herein. The memory may also be configured to cache one or more component frames 732 received from the content distribution node 716. For example, as described above in connection FIG. 6, the content distribution node 716 may transmit a component frame 732 that, while not corresponding to a content frame currently being presented, may correspond to a forward or rearward content frame that may be presented when the viewer engages a scrubbing operation. Here, the end-point node 720 may store the component frame 732 in a cache or memory section so as the component frame may be available when needed.

FIG. 8 is a simplified block structure for a computing device 800 that may be used with the network 100 or integrated into one or more of the network 100 components is shown in FIG. 1 or FIG. 7. For example, the content source 104, 704, content distribution node 116, 716, end-point nodes 108, 112, 720, or display device 736 may include one or more of the components shown in FIG. 8 and be used to execute one or more of the operations disclosed FIGS. 2-7. With reference to FIG. 8, the computing device 800 may include one or more processing elements 802, an input/output interface 804, a presentation device 806, one or more memory components 808, a network interface 810, and one or more external devices 812. Each of the various components may be in communication with one another through one or more busses, wireless means, or the like.

The processing element 802 is any type of electronic device capable of processing, receiving, and/or transmitting instructions. For example, the processing element 802 may be a central processing unit, microprocessor, processor, or microcontroller. Additionally, it should be noted that select components of the computer 800 may be controlled by a first processor and other components may be controlled by a second processor, where the first and second processors may or may not be in communication with each other.

The memory components 808 are used by the computer 800 to store instructions for the processing element 802, as well as store data, such as the fluid device data, historical data, and the like. The memory components 808 may be, for example, magneto-optical storage, read-only memory, random access memory, erasable programmable memory, flash memory, or a combination of one or more types of memory components.

The presentation device 806 provides visual and optionally audio feedback to a user and, optionally, can act as an input element to enable a user to control, manipulate, and calibrate various components of the computing device 800. The presentation device 806 may be a liquid crystal display, plasma display, light-emitting diode display, cathode ray tube display, digital projector, or similar type of display apparatus. In embodiments where the presentation device 806 is used as an input, the presentation device 806 may include one or more touch or input sensors, such as capacitive touch sensors, resistive grid, or the like.

The I/O interface 804 allows a user to enter data into the computer 800, as well as provides an input/output for the computer 800 to communicate with other devices. The I/O interface 804 can include one or more input buttons, touch pads, and so on.

The network interface 810 provides communication to and from the computer 800 to other devices. The network interface 810 includes one or more communication protocols, such as, but not limited to WiFi, Ethernet, Bluetooth, and so on. The network interface 810 may also include one or more hardwired components, such as a Universal Serial Bus (USB) cable, or the like. The configuration of the network interface 810 depends on the types of communication desired and may be modified to communicate via WiFi, Bluetooth, and so on.

The external devices 812 are one or more devices that can be used to provide various inputs to the computing device 800, e.g., mouse, microphone, keyboard, trackpad, or the like. The external devices 812 may be local or remote and may vary as desired.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The foregoing description has broad application. The discussion of any embodiment is meant only to be explanatory and is not intended to suggest that the scope of the disclosure, including the claims, is limited to these examples. In other words, while illustrative embodiments of the disclosure have been described in detail herein, the inventive concepts may be otherwise variously embodied and employed, and the appended claims are intended to be construed to include such variations, except as limited by the prior art.

What is claimed is:

1. A method of using a content distribution node to provide content from the content distribution node to an endpoint node within a distributed computer network to allow the end-point node to change a frame of content from a lower-fidelity to a full high-fidelity frame, the method comprising
    transmitting from the content distribution node a nominal variant of a high-fidelity content to the end-point node while a presentation function remains engaged at the end-point node;
    receiving at the content distribution node an indication that the presentation function is disengaged at the end-point node and that presentation of the nominal variant is paused on a particular frame, which is regarded as the lower-fidelity frame;
    pausing transmission of the nominal variant of the high-fidelity content from the content distribution node;
    transmitting from the content distribution node to the end-point node high-fidelity frame information of the high-fidelity content that corresponds to the lower-fidelity frame of the nominal variant on which presentation is paused at the end-point node to transform the lower-fidelity frame into the full high-fidelity frame, wherein the high-fidelity frame information comprises data representing all pixels in the full high-fidelity frame;
    generating a plurality of component frames as a frame set in which all pixels of the full high-fidelity frame are distributed within the frame set; and
    transmitting the high-fidelity frame information to the end-point node further includes separately transmitting each of the component frames to the end-point node for a purpose of merging at the end-point node the transmitted component frames with the lower-fidelity frame to create the full high-fidelity frame.

2. The method of claim 1 further comprising
    detecting an edge within the full high-fidelity frame; and
    withholding from inclusion in the plurality of component frames one or more pixels that are located on the edge detected in the full high-fidelity frame.

3. The method of claim 2, wherein the step of transmitting the high-fidelity frame information to the end-point node further comprises transmitting from the content distribution node to the end-point node the one or more pixels withheld from inclusion in the component frames after all of the component frames have been transmitted to the end-point node.

4. The method of claim 3, wherein the step of transmitting the high-fidelity frame information to the end-point node further comprises
    separating pixels withheld within the full high-fidelity frame into pixel groups based on a frequency in which colors associated with the pixels occur in the full high-fidelity frame; and
    wherein the step of transmitting from the content distribution node to the end-point node further includes separately transmitting each of the pixel groups.

5. The method of claim 4, wherein the step of separately transmitting each of the pixels groups further includes transmitting the pixel groups in order from a highest frequency to a lowest frequency of color occurrence.

6. The method of claim 1, wherein
    the step of receiving the indication that presentation of the nominal variant is paused on the particular frame additionally includes receiving an indication that a presentation of the particular frame is focused on a sub-area of the particular frame; and
    the step of transmitting the high-fidelity frame information to the end-point node further includes transmitting only portions of the full high-fidelity frame corresponding to the sub-area presented at the end-point node.

7. The method of claim 6 further comprising
    generating a plurality of sub-component frames based on an area of the full high-fidelity frame that corresponds to the sub-area of the particular frame displayed at the end-point node; and wherein
    the step of transmitting the high-fidelity frame information to the end-point node further includes separately transmitting each of the sub-component frames to the end-point node for a purpose of merging the sub-component frames as the sub-component frames are received at the end-point node to create the area of the full high-fidelity frame.

8. The method of claim 1, wherein
    each of the component frames of the plurality of component frames has a different level of fidelity; and
    the step of separately transmitting each of the component frames further includes transmitting the component frames in order from lowest fidelity to highest fidelity.

9. The method of claim 1, wherein the step of generating the plurality of component frames includes assigning each pixel in the full high-fidelity frame to at least one of the component frames.

10. The method of claim 1, wherein the step of generating the plurality of component frames includes assigning each pixel in the full high-fidelity frame to only one of the component frames.

11. The method of claim 1 further comprising transmitting from the content distribution node to the end-point node a second high-fidelity frame of the high-fidelity content adjacent to the full high fidelity frame that corresponds to a second frame in the nominal variant that is adjacent to the particular frame on which presentation is paused at the end-point node.

12. The method of claim 1, wherein the end-point node is a first end-point node and the method further comprises multicasting content to the first end-point node and a second end-point node including transmitting the nominal variant and the high-fidelity frame information to both the first and second end-point nodes.

13. The method of claim 1 further comprising
receiving the high-fidelity content at the content distribution node across a high-bandwidth connection from a content source, and wherein
the step of transmitting the nominal variant and the high-fidelity frame information to the end-point node further includes communicating across a limited-bandwidth connection.

14. A system for distributing content across a distributed computer network that provides for changing a frame of presented content from a lower-fidelity frame to a full high-fidelity frame comprising a content distribution node and an end-point node, wherein
the content distribution node is configured to transmit a nominal variant of a high-fidelity content to the end-point node, and further configured to transmit high-fidelity frame information of the high-fidelity content to the end-point node when an indication is received that presentation of the nominal variant is paused at the end-point node; and
the end-point node is coupled to the content distribution node across a limited bandwidth connection to receive the nominal variant and the high-fidelity information from the content distribution node over the limited bandwidth connection and is configured
to present and pause the nominal variant;
to transmit to the content distribution node an indication of a particular frame of the nominal variant upon which the presentation of the nominal variant is paused, which is regarded as the lower-fidelity frame; and
to use the high-fidelity frame information to transform the particular frame on which the presentation is paused into the full high-fidelity frame; wherein
the high-fidelity frame information comprises data representing all pixels in the full high-fidelity frame;
the data representing all pixels is distributed between a plurality of component frames as a frame set;
the content distribution node is further configured to separately transmit each of the component frames to the end-point node; and
the end-point is further configured to merge the component frames with the particular frame as the component frames are received at the end-point node to create the full high-fidelity frame.

15. The system of claim 14, wherein the content distribution node is further configured
to detect an edge within the full high-fidelity frame; and
to withhold from inclusion in the plurality of component frames one or more pixels that are located on the edge detected in the full high-fidelity frame.

16. The system of claim 15, wherein the content distribution node is further configured to transmit to the end-point node the one or more pixels withheld from inclusion in the component frames after all of the component frames have been transmitted to the end-point node.

17. The system of claim 16, wherein the content distribution node is further configured
to separate pixels withheld from inclusion in the component frames into pixel groups based on a frequency in which colors associated with the pixels occur in the full high-fidelity frame; and
to separately transmit each of the pixel groups to the end-point node.

18. The system of claim 17, wherein the content distribution node is further configured to transmit the pixel groups in order from a highest frequency to a lowest frequency of color occurrence.

19. The system of claim 18, wherein
the end-point node is further configured to focus presentation of the particular frame on a sub-area of the particular frame upon pausing presentation of the nominal variant and include information about the sub-area in the indication transmitted to the content distribution node; and
the content distribution node is further configured to identify an area of the full high-fidelity frame that corresponds to the sub-area presented at the end-point node and to transmit only portions of the full high-fidelity frame corresponding to the area of the full high-fidelity frame to the end-point node.

20. The system of claim 19, wherein
the content distribution node is further configured
to generate a plurality of sub-component frames based on an area of the full high-fidelity frame that corresponds to the sub-area of the particular frame presented at the end-point node; and
to separately transmit each of the sub-component frames to the end-point node; and
the end-point node is further configured to merge the sub-component frames as the sub-component frames are received at the end-point node to create the area of the full high-fidelity frame.

21. The system of claim 14, wherein
the end-point node is a first end-point node
the system further comprises a second end-point node;
the content distribution node is further coupled to the second end-point node across another limited-bandwidth connection and configured to multicast content to the first end-point node and the second end-point node including to transmitting the nominal variant and the high-fidelity frame information to both the first and second endpoint nodes; and
the second end-point node is configured to present and pause the nominal variant and construct the full high-fidelity frame from the high fidelity frame information.

22. The system of claim 14, further comprising a content source connected to the content distribution node across a high-bandwidth connection and configured to transmit the high-fidelity content to the content distribution node across the high-bandwidth connection.

23. The system of claim 14, wherein
each of the component frames has a different level of fidelity; and
the content distribution node is further configured to transmit the component frames in order from lowest fidelity to highest fidelity.

24. The system of claim 14, wherein the content distribution node is further configured to assign each pixel in the full high-fidelity frame to at least one of the component frames.

25. The system of claim 14, wherein the content distribution node is further configured to assign each pixel in the full high-fidelity frame to only one of the component frames.

26. The system of claim 14, wherein the content distribution node is further configured to transmit to the end-point node a second high-fidelity frame of the high-fidelity content adjacent to the full high-fidelity frame that corresponds to a second frame in the nominal variant that is adjacent to the particular frame on which presentation is paused at the end-point node.

\* \* \* \* \*